US010196952B2

(12) United States Patent
Concetto Pesce et al.

(10) Patent No.: US 10,196,952 B2
(45) Date of Patent: Feb. 5, 2019

(54) VEHICLE EXHAUST SYSTEM HAVING VARIABLE EXHAUST TREATMENT INJECTOR SYSTEM (71) Applicant: GM GLOBAL TECHNOLOGY OPERATIONS LLC, Detroit, MI (US)

(72) Inventors: Francesco Concetto Pesce, Ruesselsheim (DE); Giovanni Gallo, Ruesselsheim (DE); Isadora Ricci, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 22 days.

(21) Appl. No.: 15/449,631

(22) Filed: Mar. 3, 2017

(65) Prior Publication Data
US 2018/0252136 A1 Sep. 6, 2018

(51) Int. Cl.
*F01N 3/025* (2006.01)
*F01N 3/20* (2006.01)
(Continued)

(52) U.S. Cl.
CPC ......... *F01N 3/2066* (2013.01); *F01N 3/0253* (2013.01); *F01N 3/103* (2013.01); *F01N 3/208* (2013.01); *F01N 11/002* (2013.01); *F01N 11/007* (2013.01); *F01N 13/009* (2014.06); *F01N 2610/02* (2013.01);
(Continued)

(58) Field of Classification Search
CPC ...... F01N 3/0253; F01N 3/2066; F01N 3/208; F01N 11/002; F01N 13/009; F01N 2610/02; F01N 2610/03; F01N 2610/1453; F01N 2610/146
See application file for complete search history.

(56) References Cited

U.S. PATENT DOCUMENTS

| 2009/0235649 A1* | 9/2009 | Zhang | F01N 3/0231 60/286 |
| 2011/0197569 A1* | 8/2011 | Salanta | F01N 3/206 60/286 |
| 2013/0064744 A1* | 3/2013 | Yacoub | F01N 3/206 423/212 |

FOREIGN PATENT DOCUMENTS

| DE | 102006022599 A1 * | 11/2007 | ........... F01N 3/0253 |
| FR | 2919339 A1 * | 1/2009 | ........... F01N 3/0253 |
| JP | 2006009606 A * | 1/2006 | ........... F01N 3/2066 |

OTHER PUBLICATIONS

Majewski, W., "Filters Regenerated by Fuel Combustion," retrieved on Aug. 3, 2016 from https://www.dieselnet.com/tech/dpf_sys_fuel.php, pp. 1-4.

(Continued)

*Primary Examiner* — Audrey K Bradley
(74) *Attorney, Agent, or Firm* — Lorenz & Kopf, LLP (57) ABSTRACT An exhaust system directs flow of an exhaust gas from an internal combustion engine. The exhaust system includes an exhaust pipe, a first exhaust treatment device configured to introduce a first substance into the exhaust pipe and a second exhaust treatment device configured to introduce a second substance into the exhaust pipe. A switch is operably connected to the first and second exhaust treatment devices and is positionable in a first position and a second position. An injector is operably connected to the switch and the exhaust pipe. With the switch in the first position, the injector is configured to inject the first substance into the exhaust pipe. With the switch in the second position, the injector is configured to inject the second substance into the exhaust pipe.

18 Claims, 4 Drawing Sheets (51) Int. Cl.
*F01N 13/00* (2010.01)
*F01N 3/10* (2006.01)
*F01N 11/00* (2006.01)

(52) U.S. Cl.
CPC .... *F01N 2610/03* (2013.01); *F01N 2610/146* (2013.01); *F01N 2610/1453* (2013.01)

(56) References Cited

OTHER PUBLICATIONS

Majewski, W., "SCR Systems for Mobile Engines," retrieved on Aug. 3, 2016 from https://www.dieselnet.com/tech/cat_scr_mobile.php, pp. 1-3.
Majewski, W., "Urea Dosing and Injection Systems," retrieved on Aug. 3, 2016 from https://www.dieselnet.com/tech/cat_scr_mobile_urea_dosing.php, pp. 1-3.

* cited by examiner

VEHICLE EXHAUST SYSTEM HAVING VARIABLE EXHAUST TREATMENT INJECTOR SYSTEM

TECHNICAL FIELD

The present disclosure pertains to a vehicle exhaust system and, more particularly, pertains to a vehicle exhaust system with a variable exhaust treatment injector system.

BACKGROUND

An internal combustion engine conventionally includes an engine block with at least one cylinder. Each cylinder accommodates a piston, which is connected to a crankshaft via a connecting rod and, in conjunction with a cylinder head, defines a combustion chamber. A mixture of air and fuel is introduced into the combustion chamber and ignited in cyclical manner, thereby producing rapidly expanding gases that drive linear movements of the piston, which in turn are converted into rotation of the crankshaft by the connecting rod.

The waste gases produced by the combustion of the fuel are emitted into the atmosphere via an exhaust system. The exhaust system can include an exhaust manifold attached to the engine cylinder, an exhaust pipe extending away from the exhaust manifold, and one or more exhaust treatment devices operably coupled to the exhaust pipe in order to collect and/or alter the composition of the pollutants in the waste gases.

Some vehicles include a single exhaust treatment device. However, that device may be useful in some situations and ineffective in others. Also, these exhaust treatment devices can take up relatively large areas of space on the vehicle. Moreover, these devices can add significant weight to the vehicle, which can negatively affect fuel efficiency. Furthermore, these devices can include a relatively large number of parts, making manufacture of the vehicle difficult and time consuming.

Accordingly, it is desirable to provide an exhaust system with a plurality of exhaust treatment devices. It is also desirable to provide an exhaust system that is compact and lightweight. Moreover, it is desirable to provide a simplified exhaust system with a relatively low part count. Other objects, desirable features and characteristics will become apparent from the subsequent summary and detailed description, and the appended claims, taken in conjunction with the accompanying drawings and this background.

SUMMARY

An apparatus is provided for an exhaust system of a vehicle. The exhaust system includes an exhaust pipe configured to direct flow of an exhaust from an internal combustion engine. The exhaust system also includes a first exhaust treatment device configured to treat the exhaust gas and to introduce a first substance into the exhaust pipe and a second exhaust treatment device configured to treat the exhaust gas and to introduce a second substance into the exhaust pipe. The exhaust system further includes a switch that is operably connected to the first exhaust treatment device and the second exhaust treatment device. The switch has a first position and a second position. The exhaust system additionally includes an injector that is operably connected to the switch and the exhaust pipe. The injector is configured to inject the first substance into the exhaust pipe when the switch is in the first position. The injector is configured to inject the second substance into the exhaust pipe when the switch is in the second position.

Furthermore, a method is provided for operating an exhaust system having an exhaust pipe that directs an exhaust gas from an internal combustion engine. The method includes detecting a condition relating to the exhaust gas with a sensor. Additionally, the method includes comparing the detected condition to a threshold condition in a processor of a controller. Furthermore, the method includes switching a switch between a first position and a second position based at least partly on the comparison of the detected condition to the threshold condition. Moreover, the method includes directing the exhaust gas through a first exhaust treatment device and a second exhaust treatment device operably connected to the exhaust pipe. Also, the method includes injecting a first substance from an injector into the exhaust pipe when the switch is in the first position, and to injecting a second substance from the injector into the exhaust pipe when the switch is in the second position.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the scope of the present disclosure or the application and uses of the present disclosure. Furthermore, there is no intention to be bound by any theory presented in the preceding background or the following detailed description.

Figure 1:
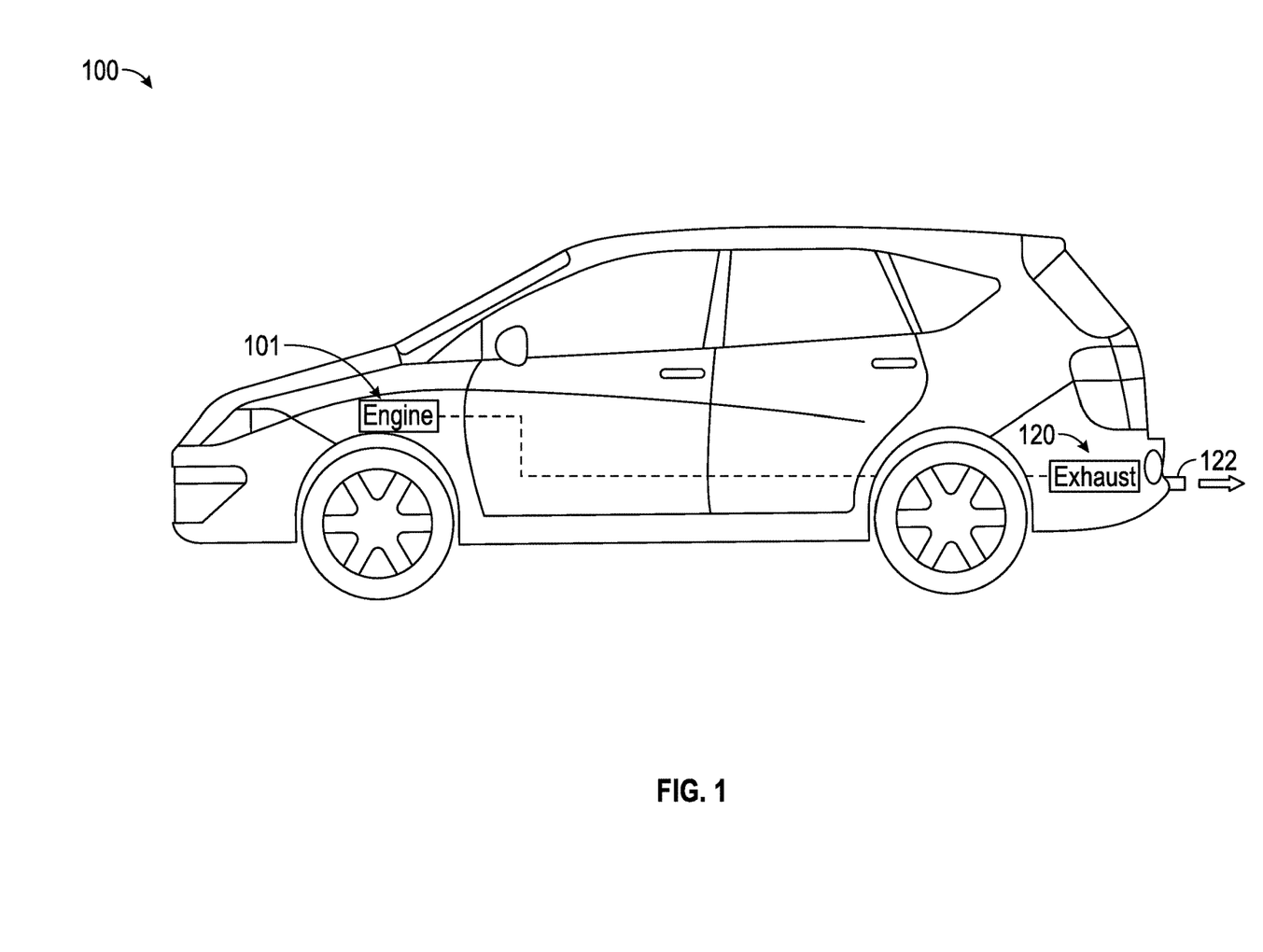
FIG. 1 is a side view of a vehicle with an exhaust system of the present disclosure.
Figure 2:
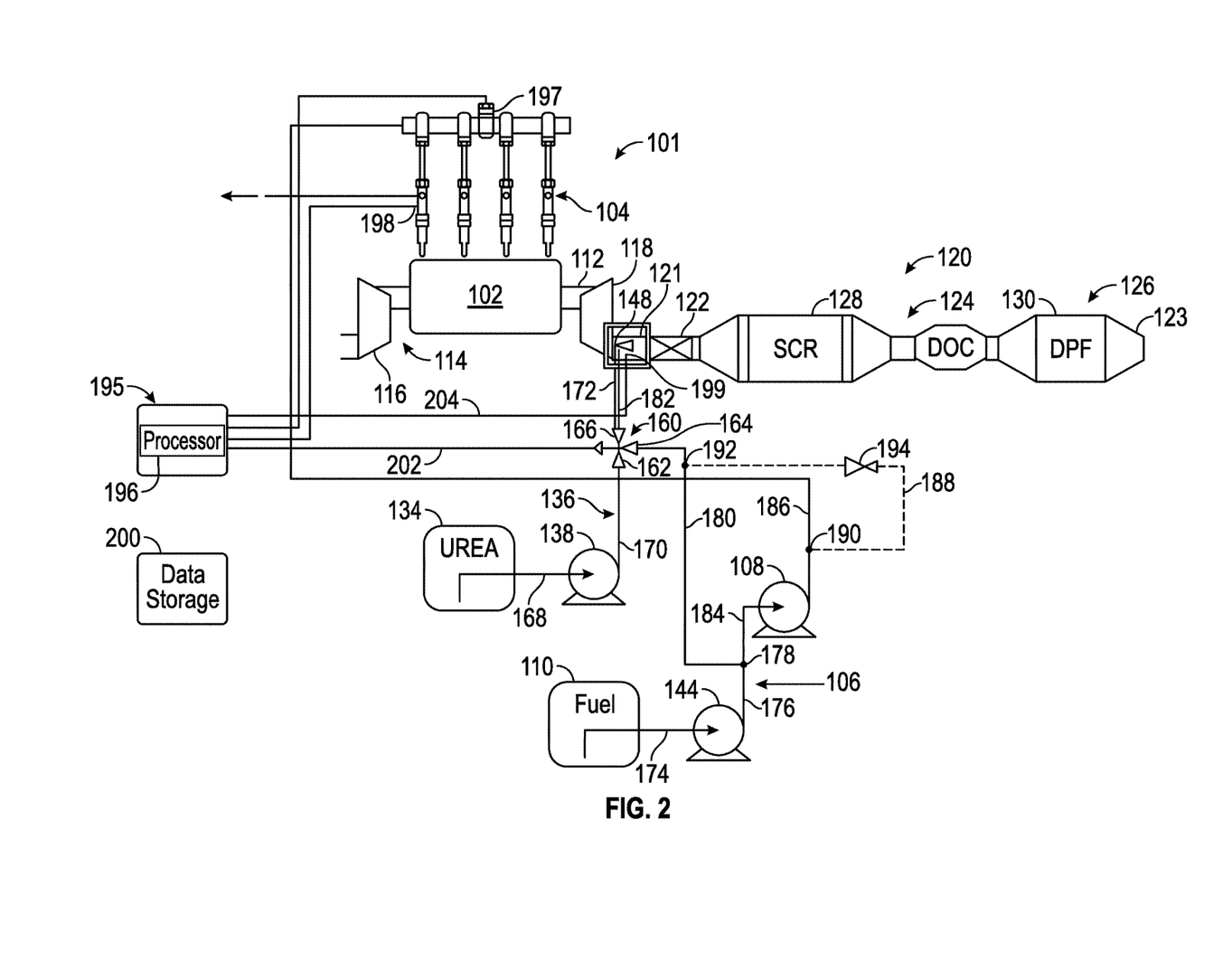
FIG. 2 is a schematic view of an internal combustion engine and an exhaust system of the present disclosure according to example embodiments.

Some embodiments may include a motor vehicle 100 as shown in FIG. 1. As shown in FIGS. 1 and 2, the vehicle 100 includes an internal combustion engine (ICE) 101 with an engine block 102. The engine block 102 may define at least one cylinder with a piston. The piston may include a linkage with which a crankshaft is turned. A cylinder head cooperates with piston to define a combustion chamber. An air-fuel mixture is introduced into the combustion chamber and ignited, resulting in hot, expanding combustion gases, which cause the piston to move back and forth within the cylinder.

The fuel is supplied to the cylinders of the engine block 102 by respective fuel injectors 104. The fuel is delivered to the fuel injectors 104 under high pressure from a fuel line 106, which is connected in fluid conducting manner to a high pressure pump 108 for pumping fuel from a fuel tank 110 (i.e., fuel source).

The ICE 101 may include other features as well. For example, each of the cylinders of the engine block 102 may include at least two valves, which are operated by a camshaft that rotates synchronously with the crankshaft. Valves may selectively allow air from an inlet to pass into the combustion chamber, and in alternation therewith permit the exhaust gases to escape via an outlet 112. In some embodiments, a camshaft phasing system may be used to selectively alter the timing sequence between the camshaft and the crankshaft. The air may be fed to air inlets via an intake manifold. In further embodiments, a system for compressed air is used, such as a turbocharger 114 with a compressor 116 that rotates together with a turbine 118. The turbine 118 is driven in rotation by the exhaust flowing from outlet 112, causing rotation of the compressor 116. The compressor 116 compresses the air, which flows back toward the engine block 102. An intercooler or other similar device may also be included for cooling the temperature of the compressed air flowing away from the compressor 116 and toward the engine block 102. Exhaust gases may exit the turbine 118 and flow to an exhaust system 120 (i.e., exhaust gas system).

The exhaust system 120 may have an exhaust pipe 122 that is configured to direct flow of the exhaust from the ICE 101. The exhaust pipe 122 may include a first end 121 disposed proximate the turbine 118 and a second end 123 that is open to atmosphere. The exhaust system 120 may include one or more exhaust treatment devices (i.e., aftertreatment devices, exhaust gas post-processing devices) for reducing emissions included in the exhaust gas flowing through the exhaust pipe 122. As will be discussed, these devices may be configured so that the material costs, part count, and/or manufacturing costs are relatively low. Also, these devices may be configured such that the exhaust system 120 is relatively compact. Additionally, the exhaust system 120 may be configured to take advantage of the high exhaust temperatures for emissions reduction.

In the embodiment of FIG. 2, for example, the exhaust system 120 may include a first exhaust treatment device 124 and a second exhaust treatment device 126. As will be discussed, the first and second exhaust treatment devices 124, 126 may share one or more common parts, share elements of a control system, or have other commonalities. The exhaust treatment devices 124, 126 may include various known devices for changing the composition of the exhaust gases. In some embodiments, the exhaust treatment devices 124, 126 may include an NOx trap (LNT), a selective catalytic reduction (SCR) device, a diesel oxidation catalyst (DOC) device, a diesel particle filter (DPF), and/or an exhaust recirculation system (EGR).

The first and second exhaust treatment devices 124, 126 may introduce a substance into the exhaust stream to treat the exhaust gas and change its composition and/or to treat parts of the exhaust system 120. The first exhaust treatment device 124 may treat the exhaust and/or parts of exhaust system 120 using a first substance; whereas the second exhaust treatment device 126 may treat the exhaust and/or parts of the exhaust system 120 using a second substance. In some embodiments, the first exhaust treatment device 124 may treat the exhaust flow at different times and/or under different conditions than that of the second exhaust treatment device 126. Accordingly, the first and second exhaust treatment devices 124, 126 may operate substantially independent of each other. However, in some embodiments, the first and second exhaust treatment devices 124, 126 may share one or more common parts. For example, the first and second exhaust treatment devices 124, 126 may share a common injector, common plumbing, common control system components, etc. for introducing the respective substances into the exhaust pipe 122.

In some embodiments, the first exhaust treatment device 124 may treat the exhaust using a reductant (i.e., a reducing agent). As such, the first exhaust treatment device 124 may be a reductant dosing system that injects or otherwise introduces a reductant into the stream of exhaust flowing through the exhaust pipe 122. The first exhaust treatment device 124 may be a urea dosing system configured to selectively introduce urea into the exhaust gas flow. For example, as shown in the illustrated embodiment, the first exhaust treatment device 124 may include a selective catalytic reduction (SCR) device 128, which is operably and fluidly connected to the exhaust pipe 122. The first exhaust treatment device 124 may also include a urea tank 134 that contains urea. The tank 134 may also include diesel exhaust fluid (DEF), which contains urea. Moreover, the first exhaust treatment device 124 may include a urea line 136 that provides a fluid path from the urea tank 134 at least partly to the exhaust pipe 122 as will be discussed. Furthermore, the first exhaust treatment device 124 may include a urea pump 138 that pumps urea from the urea tank 134 along the urea line 136 toward the exhaust pipe 122. Accordingly, urea may be supplied to the exhaust stream flowing through the exhaust pipe 122 for operation of the SCR device 128. When the urea combines with the exhaust gas in the catalyst of the SCR device 128, NOx is converted into diatomic nitrogen ($N_2$) gas and water ($H_2O$) vapor and expelled through the exhaust pipe 122. Accordingly, the SCR device 128 reduces the amount of NOx emitted to the atmosphere.

Also, in some embodiments, the second exhaust treatment device 126 may be a combustibles dosing device that injects or otherwise introduces a combustible substance into the exhaust pipe 122 to be combusted therein. For example, the second exhaust treatment device 126 may introduce a fuel into the exhaust gas flow to be combusted. Furthermore, the second exhaust treatment device 126 may include a diesel particulate filter (DPF) 132 that is operably and fluidly connected to the exhaust pipe 122. The DPF 132 may be disposed downstream of the SCR device 128 to receive exhaust gas flow therefrom. The second exhaust treatment device 126 may also include the fuel tank 110. Moreover, the second exhaust treatment device 126 may include the fuel line 106 that provides a fluid path from the fuel tank 110 at least partly to the exhaust pipe 122 as will be discussed. Furthermore, the second exhaust treatment device 126 may include at least one fuel pump 108 for pumping fuel from the fuel tank 110 along the fuel line 106 toward the exhaust pipe 122. Accordingly, fuel may be supplied to the exhaust stream flowing through the exhaust pipe 122. Thus, the second exhaust treatment device 126 may provide active regeneration in some embodiments. In the active regeneration of the DPF 132, for example, the second exhaust treatment device 126 injects fuel into the exhaust pipe 122, which is combusted to produce heat for burning off particulate matter that has collected on a filter element within the DPF 132. Once so regenerated, the DPF 132 can filter more efficiently and effectively for reducing particulate matter released to the atmosphere.

In addition, the exhaust system 120 may also include a third exhaust treatment device such as a diesel oxidation catalyst (DOC) device 130. The DOC device 130 may be operably and fluidly connected to the exhaust pipe 122. The DOC device 130 may be disposed downstream of the SCR device 128 and upstream of the DPF 132 in some embodiments. The DOC device 130 may include a porous or cellular structure coated with precious metal through which the exhaust gas flows. Also, a catalyst in the DOC device 130 may react with the exhaust gas to reduce some particulate material as well as react with carbon monoxide and hydrocarbons.

Figure 3:
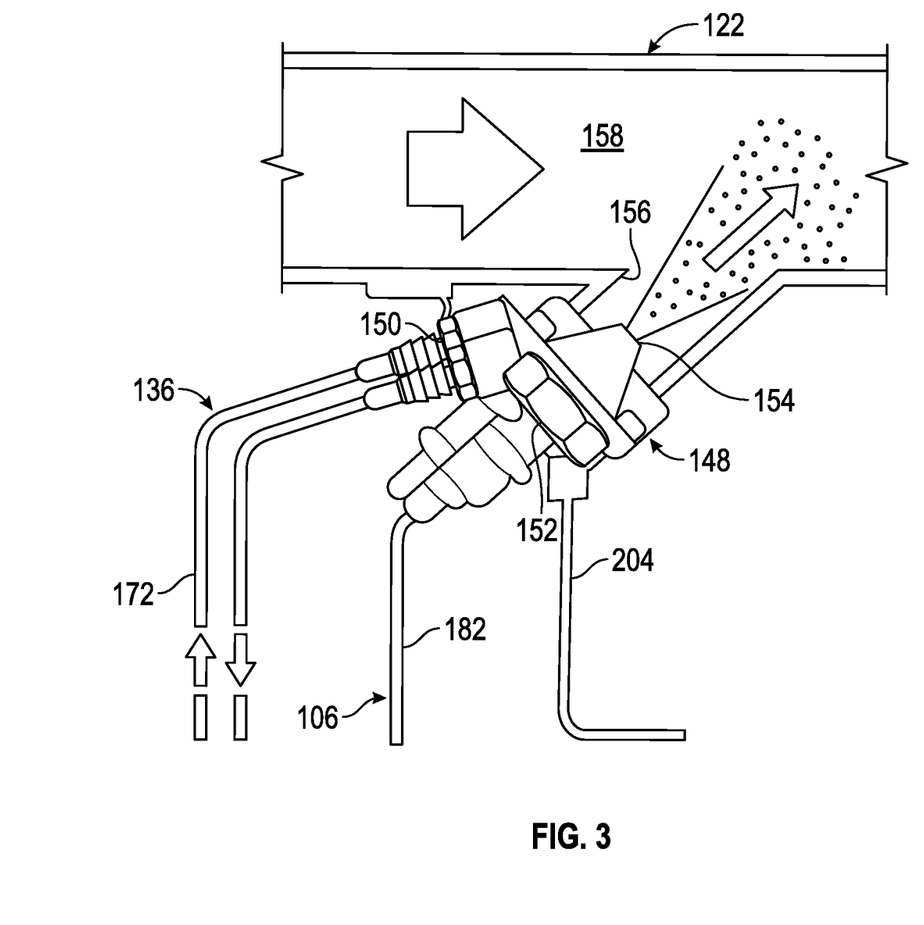
FIG. 3 is a side view of an injector of the exhaust system shown injecting a substance into an exhaust pipe according to example embodiments.

The exhaust system 120 may additionally include an injector 148. The injector 148 is shown schematically in FIG. 2. A more detailed example embodiment of the injector 148 is shown in FIG. 3. As shown in FIG. 3, the injector 148 may include at least one first port 150 that is fluidly connected to the urea line 136 of the first exhaust treatment device 124. Also, the injector 148 may include at least one second port 152 that is fluidly connected to the fuel line 106 of the second exhaust treatment system 126. Furthermore, the injector 148 may include a nozzle 154 that sprays the substances (e.g., urea or fuel) into the exhaust pipe 122. In other embodiments, the injector 148 may include the nozzle 154 for outputting the substances from the injector 148, and the injector 148 may also include a common input (i.e., a common line) that is fluidly connected to both the urea line 136 as well as the fuel line 106.

The injector 148 may be supported in a position such that the nozzle 154 is in fluid communication with the exhaust pipe 122. For example, the exhaust pipe 122 may include a hollow branch structure 156 in fluid communication with a main passageway 158 of the exhaust pipe 122, and the injector 148 may be fixed to the branch structure 156 with the nozzle 154 directed generally toward the main passageway 158. As shown in FIG. 2, the nozzle 154 may be disposed upstream of the SCR device 128 and the DPF 130.

In some situations, the nozzle 154 may be configured to atomize and spray urea supplied from the urea line 136. This may be part of an SCR event in which the urea is supplied to the SCR device 128 for reducing NOx in the exhaust stream within the exhaust pipe 122. In additional situations, the nozzle 154 may be configured to atomize and spray fuel supplied from the fuel line 106. This may be part of an active regeneration event in which the fuel is supplied to the exhaust pipe 122, and the atomized fuel combusts to generate heat for burning soot and other particulate collected within the DPF device 130.

With reference again to FIG. 2, the exhaust system 120 may include a valve or switch 160. The switch 160 may include a urea port 162 that is operably and fluidly connected to the urea line 136 and the urea tank 134 of the first exhaust treatment device 124. The switch 160 may also include a fuel port 164 that is operably and fluidly connected to the fuel line 106 and the fuel tank 110 of the second exhaust treatment device 124. The switch 160 may further include a common port 166 that is in fluid communication with the injector 148. The common port 166 may provide either urea or fuel to the injector 148.

The position of the switch 160 may determine whether the injector 148 can deliver urea or fuel to the fuel pipe 122. For example, the switch 160 may have a first position and a second position. When the switch 160 is in the first position, the urea pump 138 may pump urea from the tank 134, through the urea port 162 of the switch 160, through the common port 166, and to the injector 148 for delivery of urea into the fuel pipe 122. Conversely, when the switch 160 is in the second position, the at least one of the fuel pumps 108, 146 may pump fuel from the tank 110, through the fuel port 164 of the switch 160, through the common port 166, and to the injector 148 for delivery of fuel into the fuel pipe 122.

As shown in the embodiment of FIG. 2, the urea line 136 may include a first segment 168 extending between the tank 134 and the urea pump 138. The urea line 136 may also include a second segment 170 extending between the urea pump 138 and the urea port 162 of the switch 160. Furthermore, the urea line 136 may include a third segment 172 extending between the common port 166 and the injector 148. In some embodiments, each segment 168, 170, 172 may include separate supply lines and return lines.

In some embodiments, the fuel line 106 may feed the engine block 102 as well as the injector 148. Stated differently, the fuel line 106 may define at least two fuel paths that branch apart. One of these fuel paths may be an engine supply path that supplies the fuel injectors 104 of the engine block 102, and another may be a regeneration supply path that supplies fuel to the injector 148 of the exhaust pipe 122.

As shown in the embodiment of FIG. 2, for example, the fuel line 106 may include a first segment 174 extending between the fuel tank 110 and the second pump 144. The fuel line 106 may also include a second segment 176 extending between the second pump 144 and a first T-junction 178. Additionally, the fuel line 106 may include a third segment 180 extending between the first T-junction 178 and the fuel port 164 of the switch 160. Moreover, the fuel line 106 may include a fourth segment 182 extending between the common port 166 and the injector 148. The fuel line 106 may additionally include a fifth segment 184 extending between the first T-junction 178 and the first pump 108. The fuel line 106 may also include a sixth segment 186 (i.e., part of the "engine supply path") that extends between the first pump 108 and the common rail of the fuel injectors 104 for the engine block 102. Also, the fuel line 106 may include a second T-junction 190 and a third T-junction 192. The second T-junction 190 may be connected to the sixth segment 186, and the third T-junction 192 may be connected to the third segment 180. Furthermore, the fuel line 106 may include a pressure reducer segment 188 that extends between the second T-junction 190 and the third T-junction 192. The pressure reducer segment 188 may also include a pressure reduction member 194, such as a valve. In some embodiments, the first pump 108 may have a higher pressure output than the second pump 144. In other words, the first pump 108 may be a high-pressure pump, and the second pump 144 may be a low-pressure pump.

Also, fuel may be supplied to the fuel port 164 of the switch 160 in various ways. One or both pumps 108, 144 may supply the fuel port 164. One path defined by the fuel line 106 may fluidly connect the pump 108 and the fuel port 164. Another path defined by the fuel line 106 may fluidly connect the pump 144 and the fuel port 164. For example, the low pressure pump 144 may be operated solely, pumping fuel from the tank 110, along the first segment 174, the second segment 176 and third segment 180. Alternatively, the high pressure pump 108 may be operated solely, pumping fuel from the tank 110, via the first segment 176, the second segment 176, to the fifth segment 184, where the fuel branches at the second T-junction 190. In this manner, some fuel is directed to the engine 101, and some fuel is directed through the pressure reducer segment 188 and the third segment 180 to the fuel port 164. It will be appreciated, however, that the fuel line 106 may have various configurations without departing from the scope of the present disclosure. For example, the fuel line 106 in some embodiments may include only one of the pumps 108, 144 such that the fuel line 106 includes fewer segments than those shown in FIG. 2. In further embodiments, the second exhaust treatment system 126 may include a fuel pump that does not supply the engine block 102.

It will be appreciated that the first and second exhaust treatment devices 124, 126 may be configured in a variety of ways without departing from the scope of the present disclosure. For example, the first and second exhaust treatment devices 124, 126 may be configured for a low-pressure system, wherein fuel may be supplied by the low pressure pump 144 to supply the fuel at a predetermined pressure (e.g., approximately 450 kPa), and urea may be supplied by the urea pump 138 at a predetermined pressure (e.g., approximately 500 kPA). The first and second exhaust treatment devices 124, 126 may also be configured for a high-pressure system, wherein fuel is supplied by the high pressure pump 108 at a predetermined pressure (e.g., approximately 10 bar or higher). Furthermore, double stage pumping could be employed wherein both fuel pumps 108, 144 may be used to supply fuel to the injector 148.

Additionally, the exhaust system 120 may include a controller 195 (i.e., a control system) that includes a processor 196. The controller 195 may rely on various types of control logic without departing from the scope of the present disclosure. In some embodiments, the controller 195 may receive input in the form of an external request for either regeneration of the DPF 130 or an external request for an SCR event. The controller 195 may also receive input from various sensors that detect a current condition of the IC engine 101 and/or the exhaust system 120. The processor 196 may compare the detected condition to various threshold conditions for determining whether to conduct an SCR event by injecting urea into the exhaust pipe 122. Furthermore, the processor 196 may compare the detected condition to various threshold conditions for determining whether to conduct a regeneration event by injecting fuel into the exhaust pipe 122.

The controller 195 may output a control signal for switching the switch 160 between the first (urea dosing) position and the second (fuel dosing) position. Additionally, the controller 195 may output a control signal dictating how long respective pumps 108, 138, 144 are energized for pumping. Likewise, the controller 195 may output a control signal for dictating how long the injector 148 is to be energized for injecting the urea or fuel into the exhaust pipe 122. Similarly, the controller 195 may output a control signal for dictating an injection pulse width for the injector 148.

In some embodiments, the controller 195 may be associated with an electronic control module (ECM) that is configured to transmit and receive signals to or from various devices connected to the ICE 101. The controller 195 may receive input signals from various sensors coupled to the ICE 101 and/or the exhaust system 120. These sensors may be configured to detect a condition of the exhaust system 120. Based on these detected conditions, the controller 195 may change the position of the switch 160 between the first (urea supplying) position and the second (fuel supplying) position.

For example, the sensors of the controller 195 that are associated with the ICE 101 may include one or more of the following: a pressure and temperature sensor 197 for the manifold of the ICE 101, a sensor 198, for the pressure in the combustion chamber, sensors for the coolant and oil temperature and/or the associated fill level, a pressure sensor for the fuel, a camshaft position sensor, and a crankshaft position sensor. Additionally, the controller 195 may include one or more sensors 199 that are associated more directly with the exhaust system 120. The sensor 199 may be a temperature sensor 199 disposed inside the exhaust pipe 122 and configured to detect exhaust gas temperature therein. The sensor 199 may be a pressure sensor disposed inside the exhaust pipe 122 and configured to detect a pressure of the exhaust gas. In some embodiments, the sensor 199 may detect a pressure of the exhaust gas upstream of the DPF 130 to thereby detect a pressure load on the DPF 130. In some embodiments, the sensor 199 may be an oxygen sensor or lambda sensor and configured to detect the concentration of oxygen in the exhaust gas.

The controller 195 may also be in communication with a data storage device 200, such as a RAM or ROM memory device. The data storage device 200 may store data corresponding to predetermined threshold conditions. These thresholds may represent conditions at which urea injection should occur for an SCR event and/or conditions at which fuel injection should occur for regeneration of the DPF 130. The data storage device 200 may also include predetermined urea injection parameters (e.g., the amount of urea to be injected and/or the pulse width of the injection of urea by the injector 148 for a particular SCR event). Likewise, the data storage device 200 may communicate predetermined fuel injection parameters (e.g., the amount of fuel to be injected and/or the pulse width of the injection of fuel by the injector 148 for a particular regeneration event).

The controller 195 may further include a first control line 202 configured to transmit control signals (e.g., electric control signals) from the processor 196 to the switch 160 for changing the position of the switch 160. In some embodiments, the controller 195 may change the position of the switch 160 from the first (urea dosing) position to the second (fuel dosing) position as will be discussed in detail below.

Moreover, the controller 195 may include at least one second control line 204 configured to transmit control signals (e.g., electric control signals) from the processor 196 to the injector 148 and/or the pumps 108, 138, 144. These control signals may control the pump 108 and/or pump 144 to control the amount of fuel delivered from tank 110 to the injector 148. Likewise, the control signals may control the pump 138 to control the amount of urea delivered from tank 134. Moreover, the control signals supplied via second control line 204 may control how long the injector 148 injects and/or a pulse of the injector 148 during delivery of the material (urea or fuel) into the exhaust pipe 122.

In some embodiments, the processor 196 may be configured to receive data or signals that correspond to the conditions detected by one or more of the sensors 197, 198, 199. The processor 196 may also be configured to receive data from the data storage device 200 corresponding to predetermined thresholds (e.g., a threshold exhaust gas temperature, a threshold exhaust gas pressure, etc.). With this input, the processor 196 may compare the current conditions detected by the sensors 197, 198, 199 and compare those conditions to the threshold conditions input by the data storage device 200. Based on this comparison, the processor 196 may output a control signal to change the position of the switch 160 and/or output a control signal to operate at least one of the pumps 138, 144, 108.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure. Also, embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

In addition, those skilled in the art will appreciate that embodiments of the present disclosure may be practiced in conjunction with any number of systems, and that the controller 195 described herein is merely one exemplary embodiment of the present disclosure. Moreover, the controller 195 and/or processors 196 may be embodied by various modules. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 4:
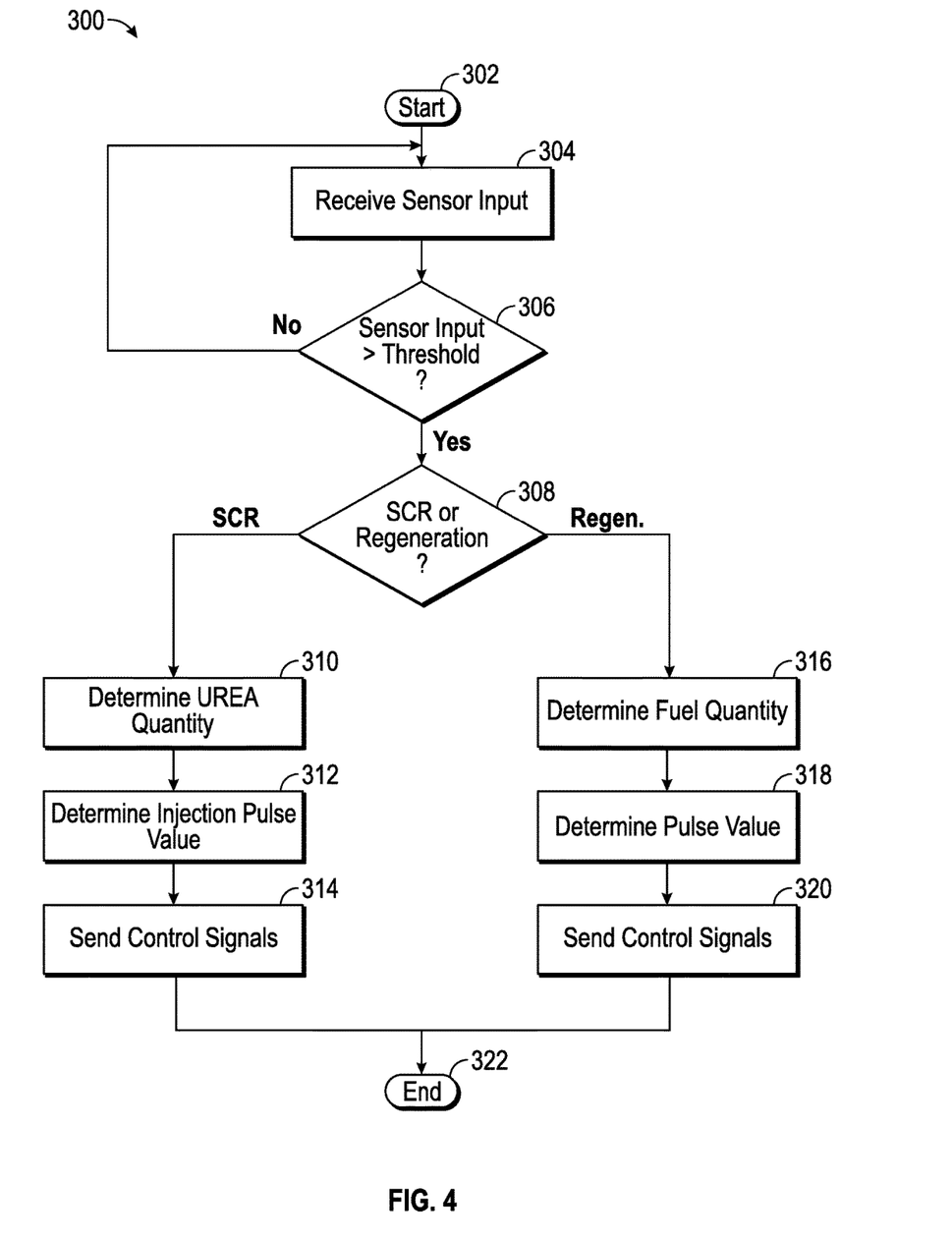
FIG. 4 is a flowchart illustrating a method of operating the exhaust system of the present disclosure according to example embodiments.

Referring now to FIG. 4, a method 300 of operating the exhaust system 120 is illustrated according to exemplary embodiments. The method 300 may begin at 302 indicating that the engine 101 is turned ON and control of exhaust system 120 is initiated. At 304 the processor 196 receives sensor input from one or more of the sensors 197, 198, 199. At 306 the processor 196 compares the sensor input (received at 304) to a predetermined threshold. For example, in some embodiments, the sensor 199 may detect the current pressure of the exhaust gas and transmit a corresponding input to the processor 196. The processor 196 may, in turn, obtain a predetermined threshold pressure value from the data storage device 200. If, at 306, the processor 196 determines that the current pressure exceeds the threshold pressure, then the processor 196 may determine that regeneration of the DPF 130 is needed. A request for regeneration may, thus, be made to initiate the regeneration event as will be described below. It will be appreciated, however, that the data processing at 306 may differ from this embodiment without departing from the scope of the present disclosure.

In an additional embodiment, the sensor 199 may detect the current temperature of the exhaust gas and transmit a corresponding input to the processor 196. The processor 196 may, in turn, obtain a predetermined threshold temperature value from the data storage device 200. If, at 306, the processor 196 determines that the current temperature exceeds the threshold temperature, then the processor 196 may determine that the temperature conditions are appropriate for an SCR event. A request for the SCR event may, thus, be made to initiate the SCR event as will be described below. It will be appreciated, however, that the data processing at 306 may differ from this embodiment without departing from the scope of the present disclosure.

Continuing at 308, the processor 196 may receive a Boolean request for either the SCR event or the regeneration event to occur. If the SCR event is requested, the method 300 may continue at 310. If the regeneration event is requested, then the method 300 may continue at 316.

If, at 308, an SCR event is requested, then the method 300 may continue at 310. At 310, the processor 196 may determine the quantity of urea to be delivered to the injector 148. Subsequently, at 312, the processor 196 may determine an injection pulse value for the injector 148. These determinations may be made based on the current conditions detected by the sensors 197, 198, 199 (e.g., current conditions of the IC engine 101, current temperature and pressure conditions of the exhaust gas, etc.). These determinations may also be based on data stored in the data storage device 200. Specifically, the data storage device 200 may include predetermined urea quantities and injector pulse values that are suitable for performing an SCR event in conditions similar to those detected by the sensors 197, 198, 199. Then, at 314, the controller 195 may output control signals to the urea pump 138 and the injector 148. The control signals may be configured to: 1) deliver the quantity of urea determined at 310 to the injector 148; and 2) pulse the injector 148 as determined at 312.

Subsequently, the method 300 may terminate at 322. It will be appreciated, however, that the method 300 may be repeated continuously (e.g., looped back to 304) as long as the engine 101 remains ON.

If, at 308, a regeneration request is made, then the method 300 may continue at 316. At 316, the processor 196 may determine the quantity of fuel to be delivered to the injector 148. Subsequently, at 318, the processor 196 may determine an injection pulse value for the injector 148 for the regeneration event. These determinations may be made based on the current conditions detected by the sensors 197, 198, 199 (e.g., current conditions of the IC engine 101, current temperature and pressure conditions of the exhaust gas, etc.). These determinations may also be based on data stored in the data storage device 200. Specifically, the data storage device 200 may include predetermined fuel quantities and injector pulse values that are suitable for performing a regeneration event in conditions similar to those detected by the sensors 197, 198, 199. Then, at 320, the controller 195 may output control signals to at least one of the fuel pumps 108, 144 and to the injector 148. The control signals may be configured to: 1) deliver the quantity of fuel determined at 316 to the injector 148; and 2) pulse the injector 148 as determined at 318.

Subsequently, the method 300 may terminate at 322. It will be appreciated, however, that the method 300 may be repeated continuously (e.g., looped back to 304) as long as the engine 101 remains ON.

Accordingly, the exhaust system 120 and its method of operation allows multiple independent exhaust treatment devices to be incorporated in the same exhaust system. Thus, the exhaust system 120 may operate effectively and efficiently in removing unwanted materials from the exhaust gas before being released to the atmosphere. Despite including multiple exhaust treatment systems 124, 126, the exhaust system 120 may be relatively compact and lightweight. Also, parts are included that are common to both systems 124, 126, thereby increasing manufacturability of the exhaust system 120.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An exhaust system of a vehicle comprising:
   an exhaust pipe configured to direct flow of an exhaust gas from an internal combustion engine;
   a first exhaust treatment device operably connected to the exhaust pipe, the first exhaust treatment device configured to treat the exhaust gas and to introduce a first substance into the exhaust pipe;

a regeneration device that includes a diesel particulate filter (DPF) operably connected to the exhaust pipe, a fuel tank configured to contain a fuel, a first pump, a second pump having a higher pressure output than the first pump, and a fuel line;

a switch that is operably connected to the first exhaust treatment device and the regeneration device, the switch having a first position and a second position; and an injector that is operably connected to the switch and the exhaust pipe;

wherein the fuel line includes a first fuel path fluidly connecting the fuel tank and the first pump to the switch for pumping the fuel from the fuel tank toward the switch;

wherein the fuel line includes a second fuel path fluidly connecting the fuel tank and the second pump to the switch for pumping the fuel from the fuel tank toward the switch;

wherein the injector is configured to inject the first substance into the exhaust pipe when the switch is in the first position; and wherein the injector is configured to inject the fuel into the exhaust pipe when the switch is in the second position.

2. The exhaust system of claim 1, wherein the first exhaust treatment device comprises a reductant dosing system and the first substance is a reducing agent.

3. The exhaust system of claim 1, wherein the fuel tank is configured to supply the fuel to both the exhaust pipe and a combustion chamber of the internal combustion engine.

4. The exhaust system of claim 1, wherein the first exhaust treatment device comprises a urea dosing device including a tank containing the first substance and a urea pump configured to pump the first substance from the tank toward the switch, wherein the first substance includes urea.

5. The exhaust system of claim 1 wherein the second fuel path branches from an engine supply path and the second fuel pump is configured to pump the fuel from the fuel tank to the internal combustion engine via the engine supply path.

6. The exhaust system of claim 1, further comprising:
a sensor configured to detect a condition of the exhaust system; and
a controller having a processor configured to change the switch between the first position and the second position based at least partly on the condition detected by the sensor.

7. The exhaust system of claim 6,
wherein the sensor comprises a pressure sensor configured to detect a pressure load on the DPF;
wherein the processor is configured to compare the detected pressure load to a predetermined threshold; and
wherein the controller is configured to change the switch to the second position to regenerate the DPF when the detected pressure load exceeds the predetermined threshold.

8. The exhaust system of claim 6, wherein the sensor comprises a temperature sensor configured to detect a temperature of the exhaust;
wherein the processor is configured to compare the detected temperature to a predetermined threshold; and
wherein the controller is configured to change the switch to the first position when the temperature of the exhaust exceeds the predetermined threshold.

9. The exhaust system of claim 1, further comprising:
wherein the first exhaust treatment device includes a selective catalytic reduction (SCR) device that is operably connected to the exhaust pipe; and
wherein the DPF is operably connected to the exhaust pipe downstream of the SCR device;
wherein the injector is disposed relative to the exhaust pipe upstream of the SCR device.

10. The exhaust system of claim 9, further comprising a diesel oxidation catalyst (DOC) device that is operably connected to the exhaust pipe downstream of the SCR device and upstream of the DPF.

11. A method for operating an exhaust system having an exhaust pipe that directs an exhaust gas from an internal combustion engine, the method comprising:
detecting a condition relating to the exhaust gas with a sensor;
comparing the detected condition to a threshold condition in a processor of a controller;
switching a switch between a first position and a second position based at least partly on the comparison of the detected condition to the threshold condition;
directing the exhaust gas through a first exhaust treatment device and a diesel particulate filter (DPF) operably connected to the exhaust pipe;
pumping, with at least one of a first pump and a second pump, a fuel from a fuel tank toward the switch, the second pump having a higher pressure output than the first pump, the first pump fluidly connected to the switch via a first fuel path, the second pump fluidly connected to the switch via a second fuel path;
injecting a first substance from an injector into the exhaust pipe when the switch is in the first position; and
injecting the fuel from the injector into the exhaust pipe when the switch is in the second position.

12. The method of claim 11, wherein the sensor is a pressure sensor and wherein detecting a condition comprises detecting a current exhaust pressure of the exhaust gas using the pressure sensor;
wherein comparing the detected condition to the threshold condition includes comparing the detected current exhaust pressure to a predetermined pressure threshold; and
wherein switching the switch includes switching the switch when the detected current exhaust pressure exceeds the predetermined pressure threshold.

13. The method of claim 12,
wherein switching the switch includes switching the switch from the first position to the second position when the detected current exhaust pressure exceeds the predetermined pressure threshold; and
wherein injecting the fuel includes injecting the fuel into the exhaust pipe for regenerating the DPF.

14. The method of claim 11, wherein detecting a condition comprises detecting a current exhaust temperature of the exhaust gas using a temperature sensor;
wherein comparing the detected condition to the threshold condition includes comparing the detected current exhaust temperature to a predetermined temperature threshold; and
wherein switching the switch includes switching the switch when the detected current exhaust temperature exceeds the predetermined temperature threshold.

15. The method of claim 14, wherein the first treatment device comprises a selective catalytic reduction (SCR) device operably connected to the exhaust pipe and the first substance include urea;

wherein switching the switch includes switching the switch from the second position to the first position when the detected current exhaust temperature exceeds the predetermined temperature threshold; and wherein injecting the first substance includes injecting urea into the exhaust pipe for operation of the SCR device.

16. The method of claim 11, further comprising determining a pulse of the injector according to the detected condition for injection of at least one of the first substance and the fuel.

17. The method of claim 11, further comprising determining an amount of at least one of the first substance and the fuel to be injected according to the detected condition.

18. The method of claim 11, wherein the first treatment device includes a selective catalytic reduction (SCR) device operably connected to the exhaust pipe, wherein the method further comprises:

injecting the first substance including urea into the exhaust pipe when the switch is in the first position; and injecting the fuel into the exhaust pipe when the switch is in the second position.

* * * * *